United States Patent [19]
Lepley

[11] 3,710,335
[45] Jan. 9, 1973

[54] AZIMUTHAL POSITIONING SYSTEM

[76] Inventor: Larry K. Lepley, 3434 C Kalihi Street, Honolulu, Hawaii

[22] Filed: May 20, 1970

[21] Appl. No.: 38,924

[52] U.S. Cl............343/112 R, 343/102, 340/27 NA, 340/29
[51] Int. Cl..............................G01s 3/02, G01s 1/08
[58] Field of Search..........343/101, 102, 107, 112 R; 356/1, 141; 340/25, 24, 27 NA, 29

[56] References Cited

UNITED STATES PATENTS 2,257,320   9/1941   Williams.............................343/102

*Primary Examiner*—Benjamin A. Borchelt
*Assistant Examiner*—S. C. Buczinski
*Attorney*—John F. McClellan, Sr.

[57] ABSTRACT

A navigation system for providing location information by triangulation, comprising at least two optical or radio or acoustic beacons spaced apart at predetermined locations, each beacon being fixed to project a frequency-dispersed spectrum in an azimuthal arc about the beacon, the arcs from the spaced beacons overlapping in the navigational area of interest, and means for identifying and comparing the frequency received from each of the beacons at any point in the area of overlap of the arcs, including an area chart showing the beacon spectra, and necessary receiving instrumentation in some embodiments.

13 Claims, 6 Drawing Figures

INVENTOR.
LARRY K. LEPLEY

INVENTOR.
LARRY K. LEPLEY
BY
John F. McClellan Jr.
ATTORNEY

INVENTOR.
LARRY K. LEPLEY

AZIMUTHAL POSITIONING SYSTEM

This invention relates generally to navigational systems and specifically to beacon systems provided with fixed sources of energy for position indicating. In open waters, compass fixes on lighthouses, in conjunction with the use of charts, are generally sufficient for navigation.

However, magnetic compass fixes sufficiently accurate for navigation in channels and obstructed waters require careful charting approximations, compasses being what they are, and the majority of watercraft are equipped with compasses of the magnetic type only.

Aside from expensive and complex devices such as radar and gyro compass systems, the lighted beacon/chart/magnetic-compass-system remains the principal aid to narrow water navigation at night.

Today there is need for a new, simpler, faster and inherently more reliable navigation system to serve the increasing number of recreational mariners piloting high speed craft.

Additionally, there is need for a precise position-indicating beacon system, which is independent of navigational compasses, for use night or day in channel dredging, buoy and oil rig setting, salvage diving, and the like.

It is, therefore, an object of this invention to provide a new beacon system for position fixing by triangulation which is at the same time simpler and more accurate than prior systems.

Another object of this invention is to provide a system as described which uniquely positions the observer by reference to two beacons without necessity for running fixes, compass determinations, or range or angle observations of any nature.

A further object of this invention is to provide a high resolution system for navigational position fixing in which observations made in rough water from a pitching and rolling platform are inherently as accurate as those made under calmer conditions.

An exemplary version of this invention embodying the above objects and advantages comprises a pair of fixed beacons so positioned so that both can be seen from the general area of navigation which they serve. Each beacon is fixed to project a continuous spectrum of light in a horizontal plane through a fan-shaped observation area centered on the particular beacon, such that a ray of a given frequency corresponds to a predetermined azimuth angle about the beacon. The arcs of projection are arranged to overlap as much as practical. The observer is supplied with a monochromator and a specially marked chart of the area served by the beacon system. To locate his position he simply observes the wavelength of light projected in his direction in the spectrum of each of the two beacons and determines the position where the two wavelengths observed cross on the area chart, which is marked with the intersections of intervals of wavelengths.

The above principle, and other objects and advantages of this invention, will become more readily apparent after examination of the following description, and of the drawings in which.

Figure 1:
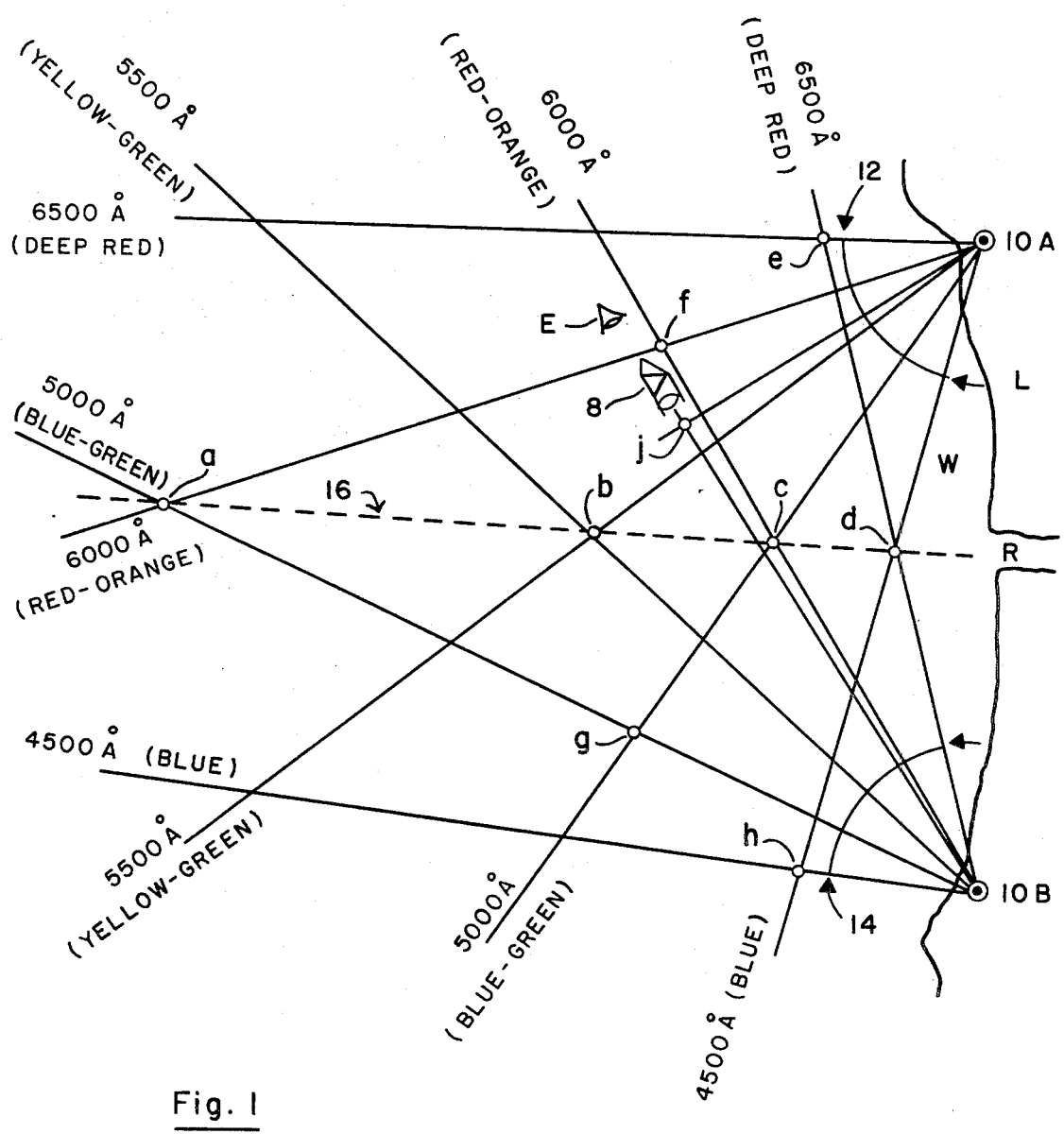
FIGS. 1 and 2 are diagrams of optical beacon systems according to this invention.

Referring now to FIG. 1 in detail, there is shown a pair of optical beacons 10A and 10B fixedly mounted on land L at elevations overlooking a reach of navigable water W.

The beacons 10 project continuous spectra in respective horizontal arcs 12 and 14 centered on the beacons.

In the example of FIG. 1, it is desired to direct mariners, approaching from open water along dashed line 16, into the mouth of river R.

Dispersed light between 4,500 A and 6,500 A Wavelength from beacons 10A and 10B is visible anywhere in this approach area. These spectral emissions appear as colored light when viewed directly by navigators. At point $a$, beacon 10A appears orange-red and beacon 10B appears blue-green. By reference to his chart which is marked to indicate the fixed angles at which the lights appear various colors, the navigator can determine his general location using the color appearances of the beacons, since they are unique to the area from which observed.

These colors will gradually and continuously change with the observer's position. There will be no edge-diffraction overlaps or discontinuities between colors, as when colored lamps are used. When the observer reaches the area of point $b$, beacon 10A will appear yellow-green and beacon 10B will also appear yellow-green. At point $c$ the beacons will have changed to blue-green and orange-red respectively. At point $d$ they will have changed to blue and deep red respectively. The observer will then presumably be in sight of the river mouth and require no further guidance.

For casual navigation in deep, unobstructed waters, the system of this invention thus provides color signals useful for guidance through direct visual observation, including in the term ordinary telescopic devices.

An interesting and useful variation provided by method of navigation can be seen by observing on the chart the color-guidance from point $e$ to point $h$ along the arc-shaped path defined by $e, f, b, g, h$. At point $e$ both beacons will appear the same, deep red. As the mariner progresses, staying on course around the arc, the beacons will confirm his navigation by changing color together, appearing lighter red at point $f$, yellow-green at point $b$, green at point $g$, and blue at point $h$. Again, it can be seen that this path is unique. Inspection will quickly show that such equal-color paths are not necessarily curved.

Figure 2:
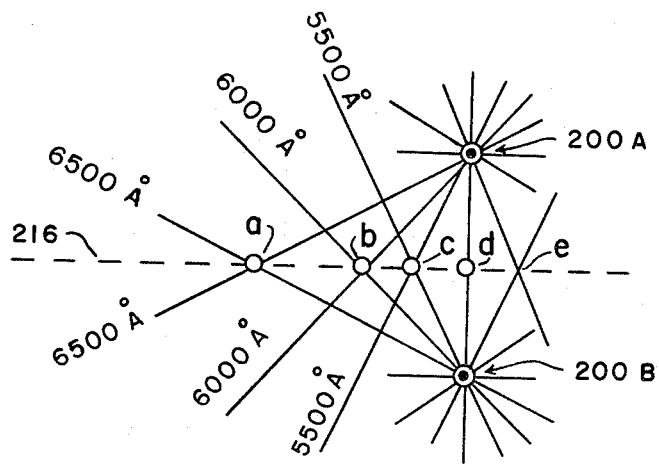

As FIG. 2 indicates, reversing the spectral order of either beacon produces a straight-line equal-color path, 216, which is uniquely defined by only two beacons 200A and 200B except at point $d$. FIG. 2 indicates also that appropriate means known in the art can be used to provide 360° coverage around the beacon sites.

In FIGS. 1 and 2 equal wavelength intervals are shown at equal angular intervals around the beacons. This is a practical arrangement, as when using diffraction gratings for normal dispersion of the light into the required spectra.

It is apparent that using the principles of this invention, equal-color curved paths for navigational guidance can be produced in large variety by varying the dispersive characteristics and the relative positions of the beacons used.

The foregoing is an introductory but not a complete description of the system of this invention. The higher use of the system is in providing extremely precise positioning information for instrument analysis rather than in providing general area information for viewing directly by the eye. To obtain precise positioning, the observer views each beacon separately with appropriate frequency-sensitive high resolution instrumentation, such as a hand-held monochromator. He obtains numerical value for the beam of light at his position from each of the respective beacons, yielding then, from the chart of the area, his location by cross bearings.

The monochromator is shown diagrammatically at 8, FIG. 1 in position before eye E to ascertain the wavelength of rays from beacon 10B.

In the example of FIG. 1, at point $a$ he would read 6,000 A for beacon 10B. At point $j$, he would read 5,654 A for beacon 10A and 5940A for beacon 10B. In either case, the angular resolution provided by the instrument exceeds that of the unaided eye by a factor of several hundred.

More importantly the absolute wavelength identification is improved even more.

As in FIG. 1, in addition to color markings, the chart for each area is marked to indicate numerical angular intervals about each beacon. To record his exact position after taking his readings, the navigator simply notes on his chart the intersection of the particular wavelengths rays or numerical values observed. It will be appreciated that for simplicity the chart of FIG. 1 is coarsely graduated, whereas in actual use, the only limitation in resolution is in chart size and scale.

The monochromator used for navigation can be an extremely simple, rugged instrument, far more accurate and reliable than any type compass, magnetic or gyro, which it replaces. It will also be apparent that motion of the vessel will have little effect on the accuracy of the navigator's observations, using this system.

Figure 3:
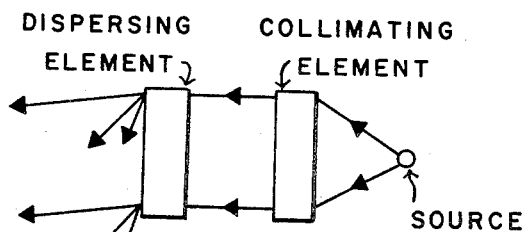
FIG. 3 is a diagram of a spectral source.

FIG. 3 is a block diagram of a spectral source, such as an incandescent tungsten filament source. Collimating elements such as lens systems and dispersing elements such as prisms and gratings are well known in the art, and need not be of any particular construction, once the type is chosen, except for considerations to avoid thermal changes causing wavelength shifts in the light pattern projected.

Figure 4:
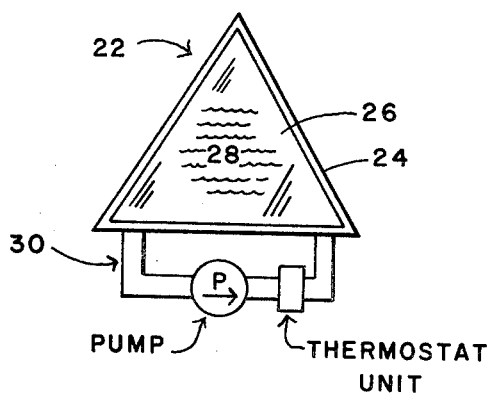
FIG. 4 is a diagrammatical plan view of a prism system assembly.

FIG. 4 is a diagram of a large thermally stabilized prism assembly suitable for use in the system of this invention.

Prism assembly 22 consists of a glass shell made of rectangular panes 24 and triangular panes 26 sealed together, as by cementing. Liquid 28 within the prism, which may be water or, preferably, other transparent liquid of higher refractive index, is circulated through a conduit 30 external to the prism by a pump and returned to the prism after passing through a thermostat-unit providing temperature regulation.

Figure 5:
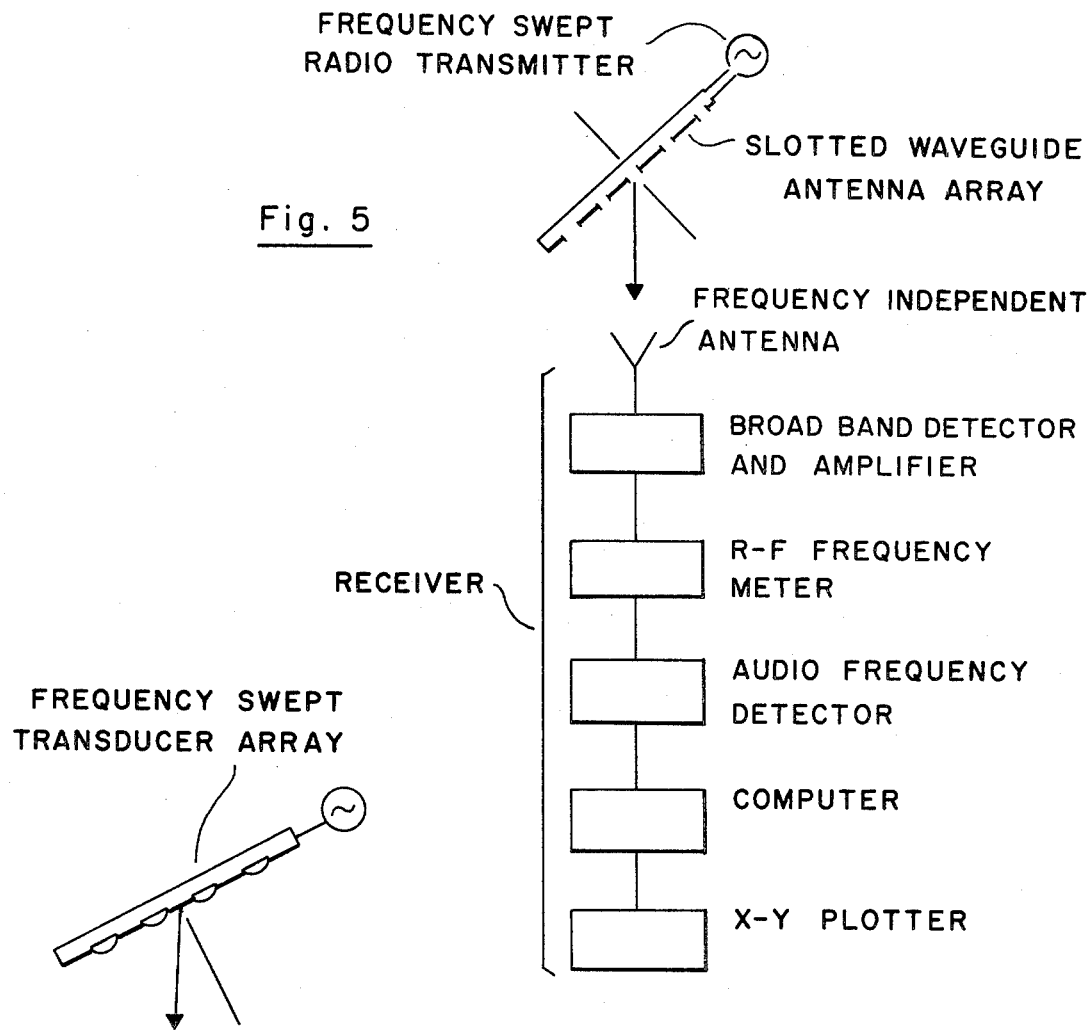
FIG. 5 is a diagram of a radio beacon system according to this invention.

FIG. 5 diagrams an extension of the principle of this invention to radio frequencies, in the form of a microwave radio beacon embodiment.

In FIG. 5, a signal within a pre-selected band width provided by a frequency-swept radio transmitter is dispersed by a slotted waveguide antenna array and the resultant spectrum is utilized in a system analogous to that illustrated in FIG. 1. Receiving means include, in a representative embodiment, the frequency-independent antenna, broad-band detector and amplifier, the RF frequency meter, the audio-frequency selector, the computor, and the $x$–$y$ plotter shown in block form.

Figure 6:
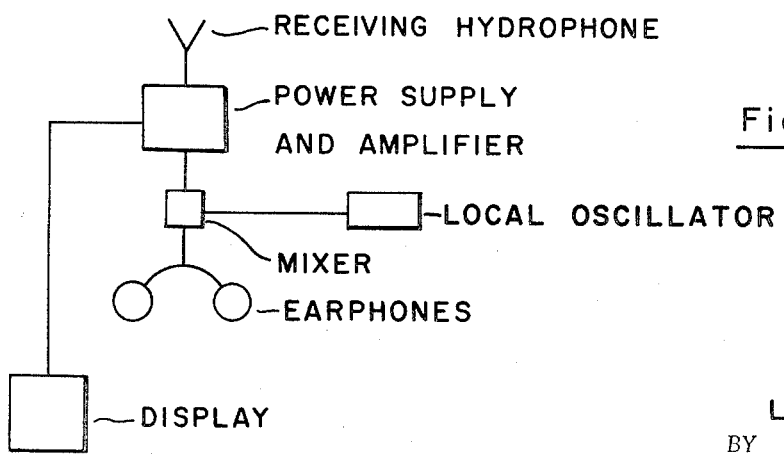
FIG. 6 is a diagram of an acoustical beacon system according to this invention.

FIG. 6 illustrates diagrammatically an extension of the principle of this invention to an acoustical system for navigation by means of underwater sensors.

In this embodiment, on excitation by generative means, an array of broad band transducers transmitting sound swept through a selected frequency band comprises a beacon source which is used in an underwater system analogous to the FIG. 1 system.

As diagrammed, the signals are received by hydrophone means, are amplified, heterodyned, and are then transmitted to the user through earphones.

The observer associates harmonics and tones with positions, or, alternatively, the positional information is plotted out by instrument and displayed.

An important application for the underwater version of this invention is in SCUBA navigation.

Obviously many modifications of the present invention are possible in the light of the above teachings. For example, the energy sources for the beacons of both the acoustic and the microwave versions can be "white" broadband sources, dispersed analogously to the optical embodiments, by means well known in the art. It is therefore to be understood that within the scope of the appended claims the invention may be practiced otherwise than as specifically described.

I claim:

1. A location information system comprising: at least two beacons, said beacons spaced apart at predetermined locations; each said beacon comprising a fixed continuous source projecting a fixed spectral continuum of frequency-dispersed energy through an arc centered on said source, whereby a unique frequency is continuously projected from each said source at every radial direction within a said arc; at least two of said arcs having an area of overlap; and means for identifying and comparing the unique frequencies projected within said area of overlap of the arcs, thereby providing location information relative to said beacons.

2. A location information system as recited in claim 1, said means for identifying and comparing the unique frequencies including a chart marked with plural radial directions from each beacon in the area of overlap of the arcs, at least one of the radial direction markings from each beacon being identified on the chart to said unique frequency projected at that radial direction by the beacon.

3. A location information system as recited in claim 2, wherein the beacons are sources of microwave radiation, and wherein the means for identifying and comparing the unique frequencies includes frequency-sensitive microwave receiving means.

4. A location information system as recited in claim 2, wherein the beacons are acoustic sources and wherein the means for identifying and comparing the unique frequencies includes a frequency-sensitive acoustic receiving means.

5. A location information system as recited in claim 2, wherein said frequency dispersion forms a spectrum in the same azimuthal direction about each of said beacons having an area of arc overlap.

6. A location information system as recited in claim 2, wherein said frequency dispersion forms spectra in respectively opposite azimuthal directions in said area of arc overlap.

7. A location information system as recited in claim 1, wherein said frequency dispersion forms a spectrum in the same azimuthal direction about each of said beacons having an area of arc overlap.

8. A location information system as recited in claim 1, wherein said frequency dispersion forms spectra in respectively opposite azimuthal directions in said area of arc overlap.

9. A location information system comprising: at least two optical radiation beacons, said beacons spaced apart at predetermined locations: each said beacon comprising a fixed continuous source for projecting a fixed spectral continuum of frequency-dispersed energy through an arc centered on said source, whereby a unique frequency is continuously projected from each said source at every radial direction within a said arc; at least two of said arcs having an area of overlap; and means for identifying and comparing the unique frequencies projected within said area of overlap of the arcs, thereby providing location information relative to said beacons.

10. A location information system as recited in claim 9 wherein the means for identifying and comparing the unique frequencies includes a chart marked with plural radial directions from each beacon in the area of overlap of the arcs, at least one of the radial direction markings from each beacon being identified on the chart to said unique frequency projected at that radial direction by the beacon.

11. A location system as recited in claim 9, wherein each said fixed source is arranged to project a said continuum of frequency dispersed energy in the form of a spectrum, the azimuthal direction of dispersion being the same at each beacon.

12. A location information system as recited in claim 9 wherein each said fixed source is arranged to project a said continuum of frequency dispersed energy in the form of a spectrum, the azimuthal direction of dispersion at a first said beacon being different from the azimuthal direction of dispersion at a second said beacon, the first and second said beacons having an area of arc overlap.

13. A location information system comprising at least two optical radiation beacons, said beacons spaced apart at predetermined locations; each said beacon comprising a fixed continuous source projecting a fixed continuum of frequency-dispersed energy through an arc centered on said source, whereby a unique frequency is continuously projected from each said source at every radial direction within a said arc, at least two of said arcs having an area of overlap; and monochromator means for identifying and comparing the unique frequencies projected within said area of overlap of the arcs, thereby providing location information relative to said beacons.

* * * * *